United States Patent
Davis

(10) Patent No.: US 7,394,782 B2
(45) Date of Patent: Jul. 1, 2008

(54) REDUCED POWER TIME SYNCHRONIZATION IN WIRELESS COMMUNICATION

(75) Inventor: Keith Davis, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 411 days.

(21) Appl. No.: 11/160,908

(22) Filed: Jul. 14, 2005

(65) Prior Publication Data

US 2007/0014264 A1 Jan. 18, 2007

(51) Int. Cl.
*H04Q 7/00* (2006.01)

(52) U.S. Cl. .................. 370/324; 370/350; 370/329; 370/348; 370/318; 370/311; 455/502; 455/507

(58) Field of Classification Search .................. 370/336, 370/310–311, 278, 282, 318, 324, 328–329, 370/338, 348, 349, 350; 455/502, 507, 517, 455/522, 69, 574, 127.5
See application file for complete search history.

(56) References Cited

U.S. PATENT DOCUMENTS

| | | | |
|---|---|---|---|
| 3,643,183 A | 2/1972 | Geffe | |
| 3,715,693 A | 2/1973 | Fletcher et al. | |
| 3,758,885 A | 9/1973 | Voorman et al. | |
| 4,264,874 A | 4/1981 | Young | |
| 4,529,947 A | 7/1985 | Biard et al. | |
| 4,614,945 A | 9/1986 | Brunius et al. | |
| 4,812,785 A | 3/1989 | Pauker | |
| 4,843,638 A | 6/1989 | Walters | |
| 5,392,003 A | 2/1995 | Nag et al. | |
| 5,428,602 A | 6/1995 | Kemppainen | |
| 5,428,637 A | 6/1995 | Oliva, Jr. et al. | |

(Continued)

FOREIGN PATENT DOCUMENTS

CH 673184 2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner*—William G. Trost
*Assistant Examiner*—Kamran Afshar

(57) ABSTRACT

Methods, devices, and systems for wireless communication in which one or more devices are scheduled to awake from a low power sleep state at a scheduled time for data transmission. An illustrative embodiment addresses difficulties that may arise as a result of clock errors that can occur when a device enters a sleep mode for a period of time with a scheduled wake-up time. The device that enters sleep mode may be a remote device in a system including a master device that devises a schedule for the remote device to enter and exit sleep and active communication modes. In one embodiment, the active window for a remote device is extended for a period of time related to the period between a reference time and the remote device transmission time. In another embodiment, a master device is adapted to schedule active time periods for remote devices by including an adjustment for time uncertainty caused by clock errors, the adjustment being related to the period between a reference time and the remote device transmission time. The methods may be adaptive to individual remote devices.

20 Claims, 3 Drawing Sheets

U.S. PATENT DOCUMENTS

| | | | |
|---|---|---|---|
| 5,430,409 | A | 7/1995 | Buck et al. |
| 5,438,329 | A | 8/1995 | Gastouniotis et al. |
| 5,451,898 | A | 9/1995 | Johnson |
| 5,481,259 | A | 1/1996 | Bane |
| 5,642,071 | A | 6/1997 | Sevenhans et al. |
| 5,659,303 | A | 8/1997 | Adair, Jr. |
| 5,726,603 | A | 3/1998 | Chawla et al. |
| 5,767,664 | A | 6/1998 | Price |
| 5,809,013 | A | 9/1998 | Kackman |
| 5,847,623 | A | 12/1998 | Hadjichristos |
| 5,963,650 | A | 10/1999 | Simionescu et al. |
| 6,052,600 | A | 4/2000 | Fette et al. |
| 6,058,137 | A | 5/2000 | Partyka |
| 6,091,715 | A | 7/2000 | Vucetic et al. |
| 6,175,860 | B1 | 1/2001 | Gaucher |
| 6,353,846 | B1 | 3/2002 | Fleeson |
| 6,366,622 | B1 | 4/2002 | Brown et al. |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,901,066 | B1 | 5/2005 | Helgeson |
| 2002/0011923 | A1 | 1/2002 | Cunningham et al. |
| 2002/0085622 | A1 | 7/2002 | Dhar et al. |
| 2002/0141479 | A1 | 10/2002 | Garcia-Luna-Aceves et al. |
| 2002/0146985 | A1* | 10/2002 | Naden .................. 455/574 |
| 2003/0053555 | A1 | 3/2003 | McCorkle et al. |
| 2003/0086393 | A1* | 5/2003 | Vasudevan et al. .......... 370/330 |
| 2003/0198280 | A1 | 10/2003 | Wang et al. |
| 2004/0253996 | A1 | 12/2004 | Chen et al. |
| 2005/0049012 | A1* | 3/2005 | Chang et al. ............ 455/574 |
| 2005/0281215 | A1 | 12/2005 | Budampati et al. |
| 2006/0056322 | A1* | 3/2006 | Simpson et al. ........... 370/349 |
| 2006/0099980 | A1* | 5/2006 | Nielsen et al. ............. 455/507 |
| 2006/0256756 | A1* | 11/2006 | Wakabayashi .......... 370/335 |

FOREIGN PATENT DOCUMENTS

| | | |
|---|---|---|
| DE | 4344172 | 6/1995 |
| EP | 0607562 | 7/1994 |
| EP | 0893931 | 1/1999 |
| WO | WO 00/70572 | 11/2000 |

OTHER PUBLICATIONS

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE Infocom 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bamboweb.com/articles/o/s/OSI_model.html, "Bambooweb OSI model," Bambooweb Dictionary, 5 pages, printed May 23, 2005.

http://www.dailywireless.org/modules.php?name=News&file=article&sid=871, "Location By Triangulation—Not," Daily Wireless, 2 pages, printed May 2, 2005.

http://www.unstrung.com/document.asp?site=unstrung&doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al., "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

\* cited by examiner

| | Absolute | Per Cycle (X) |
|---|---|---|
| First Actual Error | D | $D/N_1$ |
| Second Actual Error | E | $E/N_2$ |
| Third Actual Error | F | $F/N_3$ |
| Fourth Actual Error | G | $G/N_4$ |

Communication Window =
$T_S + N*(\mu_X - M\sigma_X)$ to $T_S + T_C + N*(\mu_X + M\sigma_X)$ N is the number of cycles between a reference time and $T_S$

REDUCED POWER TIME SYNCHRONIZATION IN WIRELESS COMMUNICATION

FIELD

The present invention is related to the field of wireless communication. More specifically, the present invention relates to scheduled wireless communication.

BACKGROUND

Wireless communication may be used in a variety of contexts. One example is the use of wireless communications for building control or monitoring systems. In one such system, a master device may communicate wirelessly with a number of remote devices. If multiple remote devices attempt to transmit at once, data collisions can result in lost data packets. Various solutions to this problem have been proposed, but further improvement remains desirable.

SUMMARY

The present invention, in several illustrative embodiments, includes methods, devices, and systems for wireless communication in which one or more devices are scheduled to awake from a low power sleep state at a scheduled time for data transmission. An illustrative embodiment addresses difficulties that may arise as a result of clock mismatches that can occur when a device enters a sleep mode for a period of time with a scheduled wake-up time. The device that enters sleep mode may be a remote device in a system including a master device that has or creates a schedule for the remote device to enter and exit sleep and active modes. In one embodiment, the active window for a remote device is extended for a period of time that is related to the period between a reference time (such as a last synchronization with the master device) and the remote device transmission time. In some embodiments, a master device is adapted to schedule active time periods for remote devices by including an adjustment for time uncertainty caused by clock mismatches, the adjustment being related to the period between a reference time (such as a last synchronization between the master device and the remote device) and the remote device transmission time.

DETAILED DESCRIPTION

The following detailed description should be read with reference to the drawings. The drawings, which are not necessarily to scale, depict illustrative embodiments and are not intended to limit the scope of the invention.

As used herein, a low power sleep mode is a lower power mode in which a device may operate wherein the device does not provide power to communicating circuitry therein. For example, a sensor having wireless communication functionality may enter a "low power sleep mode" by shutting down the wireless communication circuits therein, sometimes including amplifiers, sampling circuits, and/or modulators/demodulators associated with communication. In some cases, a sensor in such a mode may continue to gather and record data, but it may save power by not performing communication tasks during the low power sleep mode.

Figure 1:
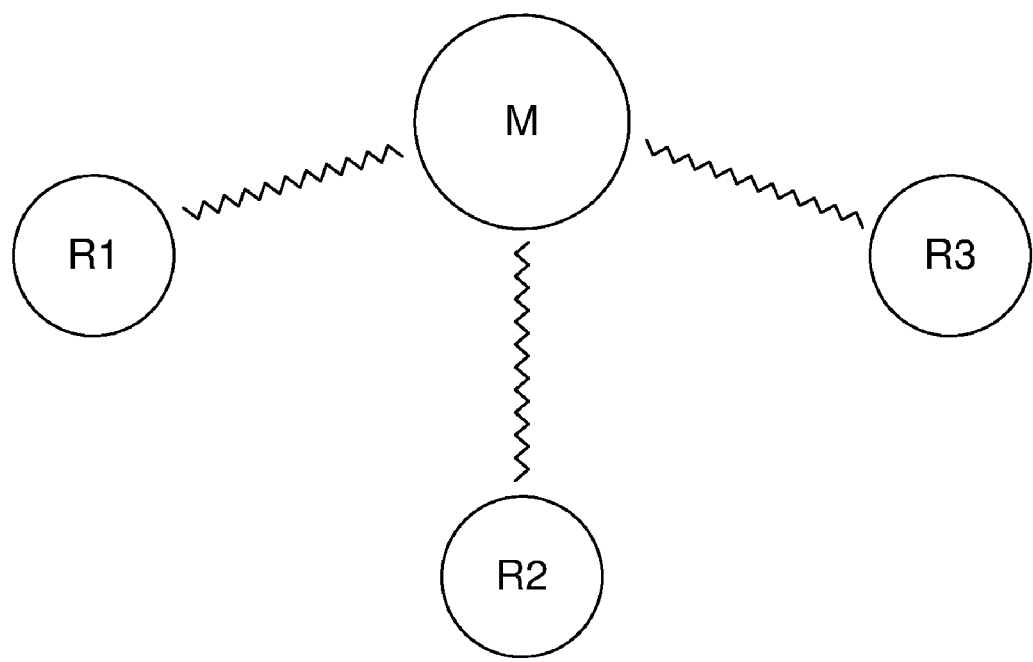
FIG. 1 is a schematic representation of a wireless communication system.

FIG. 1 is a schematic representation of a wireless communication system. A master device M is shown, as well as several remote devices R1, R2, R3. Each remote device may be, for example, a data gathering device such as a sensor. For example, the devices M, R1, R2, R3 may include a transmitter and receiver or a transceiver configured for wireless communication. Such communication may occur at a desired frequency, within a range of frequencies, or within one or more bands of frequencies.

The master device M may be coupled to another network and/or may be coupled to other devices using different communications modes. For example, if used in a fire/security system, the remote devices R1, R2, R3 may be security sensors and/or smoke/fire detectors, with the master device M coupled to a controller for the system that performs monitoring functions as well as a telephone or other connection for contacting emergency services. In another example, the master device M may be a heating, ventilation, and air conditioning (HVAC) controller coupled to HVAC components, while the remote devices R1, R2, R3 may be HVAC sensors for sensing interior and/or exterior conditions such as temperature, humidity, occupancy, and/or air quality, for example.

In some embodiments, the system shown operates within frequency constraints such that each of the devices communicates with one another wirelessly across a medium (air) using one or only a few frequencies. If desired, the master device M may have broadcast capabilities allowing it to communicate with all of the remote devices R1, R2, R3 at once. The remote devices R1, R2, R3 may have such capability as well, if desired.

It may be desirable to provide a system that allows communication between a remote device R1 and the master device M without data collisions with communications between other remote devices R2, R3 and the master device M. While multiple frequencies can be assigned, with each remote device R1, R2, R3 having its own frequency, this may add to the complexity of the system, limit system size, and/or create problems in a noisy environment. As a result, in some embodiments of the present invention, a schedule for communication may be generated for controlling data transmission. Some illustrative aspects of such a system may be found in U.S. patent application Ser. No. 09/311,014, entitled WIRELESS CONTROL NETWORK WITH SCHEDULED TIME SLOTS, filed May 13, 1999, the disclosure of which is incorporated herein by reference.

For example, the master device M may include a controller and controller readable media embodying controller programming. Included in the controller programming may be a master scheduler, which is a controller function for generating a schedule for communications. The master scheduler may be adapted to plan, in any suitable data structure, for communication with the remote devices R1, R2, R3, in a temporally divided manner. Thus, M may engage in uni- and/or bi-directional communication with a first remote device R1 during a first time period, with a second remote device R2 during a second time period, and with a third remote device R3 during a third time period. The first, second and third time periods may be non-overlapping.

Occasionally, the master device M may also generate a broadcast signal identified for processing by each of the remote devices R1, R2, R3 at once. Otherwise, the master device may address messages to only one or a small number of remote devices (for example, remote device R1) so that other remote devices (R2, R3) will ignore the addressed message. Scheduling information for data transmission by the remote devices R1, R2, R3 may be communicated by the master device M to the remote devices R1, R2, R3 in any suitable manner, for example, via broadcast, or via individually addressed messages.

Figure 2:
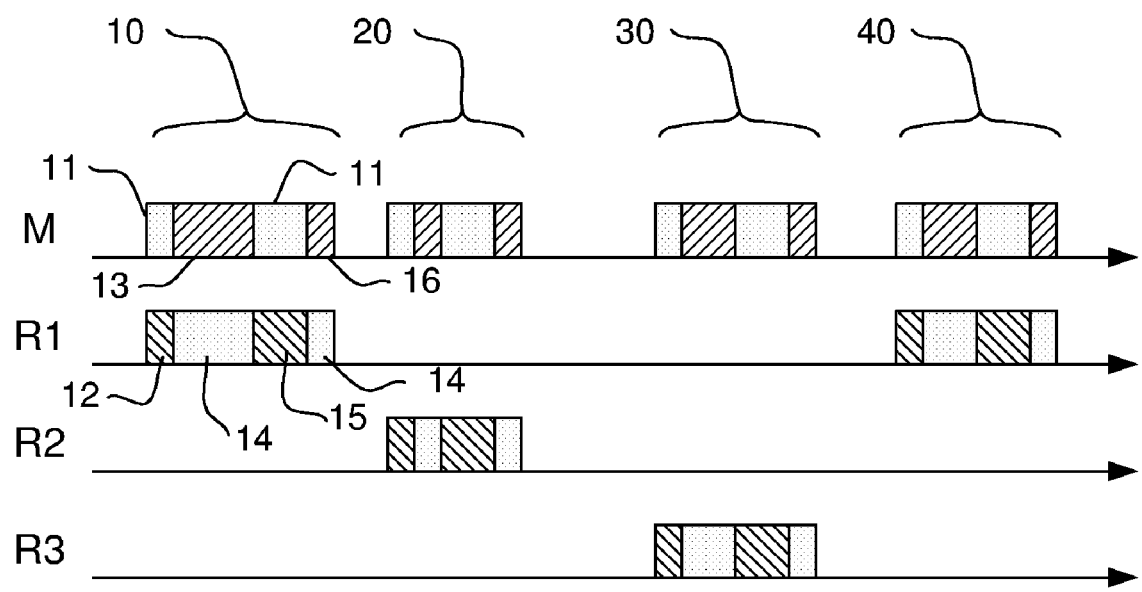
FIG. 2 is a time diagram showing point-to-point communication in a scheduled wireless communication system.

FIG. 2 is a timing diagram showing point-to-point communication in an illustrative scheduled wireless communication system. The system includes a master device M and remote devices R1, R2, R3. The lines extending to the right of the devices M, R1, R2, R3 illustrate a communications timeline. Four communication time slots 10, 20, 30, 40 have been defined by a master scheduler in master device M. Within a communication time slot 10, the remote device, R1, that is scheduled to transmit information may awaken from a low power sleep mode to perform data transmission.

During the illustrative communications timeline the master device M receives data as indicated by particularly configured portions 11 of the M timeline. Likewise, device R1 may receive information during particular portions 14 of the R1 timeline. During time slot 10, communication begins after R1 becomes active and sends a ready-to-send signal shown at 12. During a corresponding time period, M receives the ready-to-send signal. M then generates a clear-to-send signal 13, which may further include data and instructions if desired. For example, clear-to-send signal 13 may also include scheduling information indicating when the next communication from R1 is scheduled; M may also send synchronization data to R1 to aid in synchronizing the remote device's clock. If desired, the clear-to-send signal 13 may also indicate what sort of data is desired by M from R1.

After receiving the clear to send signal 13, R1 generates a data signal 15 that is transmitted to M. If the data signal 15 is properly received, M may generate an acknowledgement 16. If R1 receives the acknowledgement 16, R1 may clear appropriate data stacks/caches or queues related to the sent data, if desired. R1 then returns to its low power sleep mode until the next scheduled transmission time, shown illustratively as time slot 40.

Time slots 20 and 30 are designated for transmission by R2 and R3, respectively. It can be seen that the duration of communication for each of the time slots may vary, for example, as communications in time slot 10 take a greater period of time than communication in time slot 20. This variability may occur in some embodiments, if so desired. The different remote devices R1, R2, R3 may in fact be different types of devices generating different amounts or types of data, for example, R1 may be a smoke detector, R2 may be a detector for observing whether a door is open or closed, and R3 may be a motion sensor.

Figure 3:
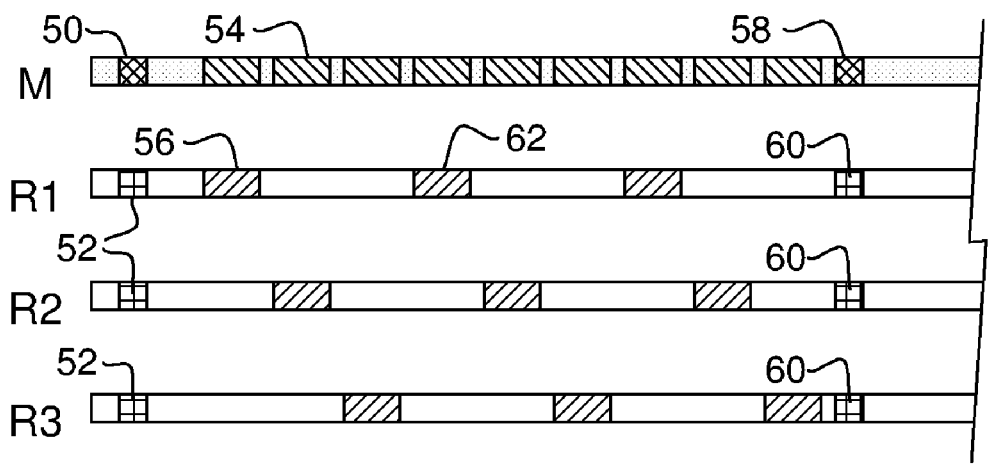
FIG. 3 illustrates a timing diagram for an illustrative embodiment.

FIG. 3 illustrates a timing diagram for an illustrative embodiment. In this diagram, several blocks indicate time usage for a master device M and remote devices R1, R2, R3. The master device is shown generating a broadcast signal at 50, which is received by each of the remote devices, as shown at 52. The broadcast signal 50 may include data relaying a schedule for transmissions to the remote devices R1, R2, R3. After the broadcast signal 50, the master M waits for a first transmission 56 from a first scheduled transmitting remote device (in the example, R1). Blocks 54 indicate time periods in which the master device is communicating with one of the remote devices. The blocks of remote device communications by the master device may be separated, as shown, or may instead virtually bump against one another. If desired, rather than using a broadcast signal 50, scheduling information and/or clock synchronization information may be transmitted from the master device M to the remote devices R1, R2, R3 with individually addressed transmissions.

Periodically there may be another broadcast signal 58 from M, received, as shown at 60, by the remote devices R1, R2, and R3. The broadcast signals 50, 58 may provide a reference time that can be used in some of the embodiments further described below, wherein the reference time is used for synchronization purposes. Alternatively, each individual communication such as communication 56 may be a point of reference for a next communication with the same device. For example, with respect to communication 56, R1 may use the first broadcast signal 50 to provide a time reference, while with respect to communication 62, R1 may use either communication 56 or the first broadcast signal 50 to provide a time reference.

While FIG. 2 illustrates communications that included various interactive portions including a ready to send signal, a clear to send signal, data, and acknowledgements, FIG. 3 provides a more generic example wherein communication may be less interactive. Specifically, there is no need shown in FIG. 3 for any of the ready to send, clear to send, or acknowledgement signals. Instead, data may be sent from the remote devices R1, R2, R3 to the master device M without such interaction. This may conserve energy by reducing computation and communication levels, for example, by allowing the remote devices R1, R2, R3, to simply send data without having to "listen" for a response. The "listening" by the remote devices may include the use of an amplifier attached to an antenna, along with associated processing circuitry, to receive signals. However, by omitting the acknowledgement, the system may operate without checking whether data is correctly received. This can lead to a loss of data if, for example, data is purged by the remote devices R1, R2, R3 after it is sent. Any suitable combination of communication messages may be included in the two-way communication, as desired.

FIGS. 2 and 3 show systems wherein communications take place at approximately equal intervals for each remote device. In some systems, different remote devices may have different scheduling frequencies (i.e. R1 may be scheduled for communications once every ten seconds, while R2 is scheduled for communications once every minute).

One of the difficulties which can arise with the embodiment of FIG. 3 is that communications from the remote devices R1, R2, R3 to the master device are performed by having the remote devices R1, R2, R3 wait in a sleep mode until an appropriate time for data transmission. This "wait" period is reliant upon an internal clock for the remote devices R1, R2, R3. The master device, M, will expect the communication to occur when its clock indicates a desired passage of time. However, the remote device clock and the master clock will not necessarily be precisely coordinated. For any "clock" circuit, the following equation may characterize operation:

$$P_A = P_D + \Delta t$$

The equation assumes that the actual clock period ($P_A$) is equal to a desired clock period ($P_D$) plus an error ($\Delta t$). For example, a one megahertz clock is expected to have a clock period of one microsecond. The error, $\Delta t$, may relate to any number of difficulties for a given device, including inherent mismatches in clock signals, clock inaccuracy, power source degradation, or other problems. An error of +0.1%, for a one megahertz clock, would suggest a clock period of one microsecond plus one nanosecond. Over the course of many cycles, such an error may become significant. Δt may be treated as an average value of such error.

During active communication, various clocks may be re-synchronized periodically or as needed. However, when one of the devices enters a low power mode and is expected to "awake" at a desired time, there is no opportunity during the low power mode to re-synchronize. Furthermore, even if clocks are re-synchronized, some communications schemes for synchronization are concerned primarily with causing the leading edge of clock signals to be aligned for two devices. Thus synchronization does not make up for under- or over-counted cycles. For example, if a remote device has a clock that is operating with a shorter period than the master device, the clock signals may be synchronized at given time even though registers associated with each clock are misaligned.

One solution to this difficulty may be to provide for a fixed extension on the active window for a device that is expected to sleep for a period of time. For example, a device may "awaken" prior to the time it is expected to be ready to transmit by a fixed amount. However, this solution does not account for the above equation. Specifically, it may be more energy efficient to adjust the extension of "on" time in light of the number of clock cycles that occur from a last reference time. For example, the anticipated error, E, for a clock signal after N cycles may be considered as:

$$E = N * \Delta t$$

The number of cycles, N, will vary depending upon the period of time that has passed since the last reference time. For example, referring to FIG. 3, the error E for R1 before its first communication 56 after the broadcast signal 50 can be expected to be relatively smaller (assuming R1 and R3 are identical devices) than the error E for R3 before its first communication after the broadcast signal 50, because the period of time that expires before R3 communicates is greater than the period before R1 communicates. Several embodiments of the present invention address this variability in clock errors.

In an illustrative embodiment, the active window for a remote device is extended for a period of time related to the period between a reference time (such as a last synchronization with the master device) and the remote device transmission time. In another embodiment, a master device is adapted to schedule active time periods for remote devices by including an adjustment for time uncertainty caused by clock errors, the adjustment being related to the period between a reference time (such as a last synchronization between the master device and the remote device) and the remote device transmission time.

Figure 4:
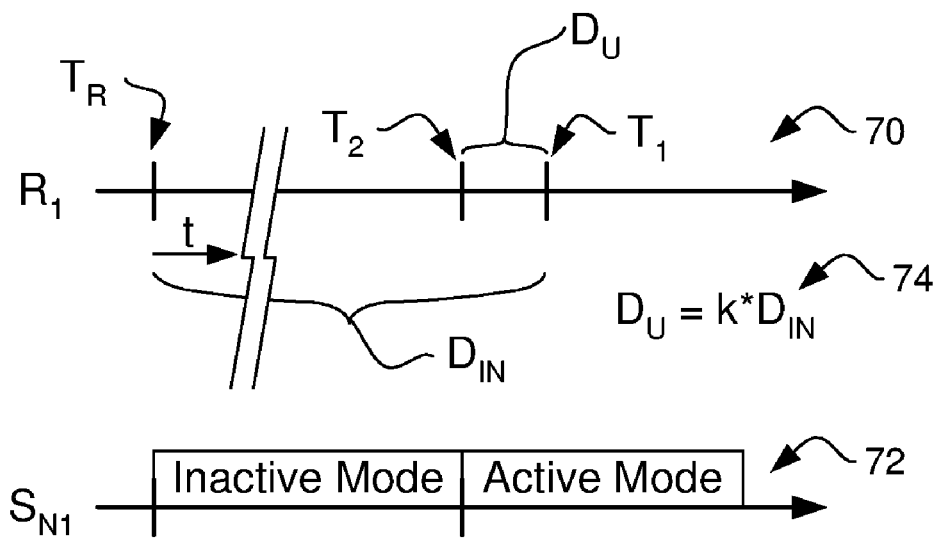
FIG. 4 illustrates a timing diagram for another illustrative embodiment.

FIG. 4 illustrates a timing diagram for another illustrative embodiment. FIG. 4 shows a timeline 70 and state indicator 72 for a remote device R1. Referring to the timeline, a reference time $T_R$ is shown. R1 receives a signal indicating a first time $T_1$ that an associated master device has scheduled for communication with R1. A duration of time, $D_{IN}$, between the reference time $T_R$ and the first time $T_1$ can then be defined. As shown at 74, in the illustrative example, an algebraic expression is used to calculate an uncertainty duration $D_U$ by multiplying $D_{IN}$ by a constant k. The method includes counting back by this duration $D_U$ to adjust the scheduled time at which the device becomes active. Instead of becoming active at time $T_1$, which is the scheduled time, the device becomes active at time $T_2$, prior to the scheduled time. This is shown in the state indicator 72.

While a simple, directly proportional type of algebraic expression is used in the example of FIG. 4, other relationships may be formed, using, for example, the form Ax+B or higher order algebraic equations. Other types of formulae, such as logarithmic scales, may be used as well. Alternatively, a lookup table can be provided. Each of these manners for calculating the uncertainty duration $D_U$ is an illustrative manner of generating a time uncertainty that is related to the time from a reference time to a time that the device is supposed to be ready for communication. Other formulae may also be suitable; it is believed sufficient that there be a relationship wherein the time uncertainty increases with the amount of time that has passed since a reference time.

Figure 5:
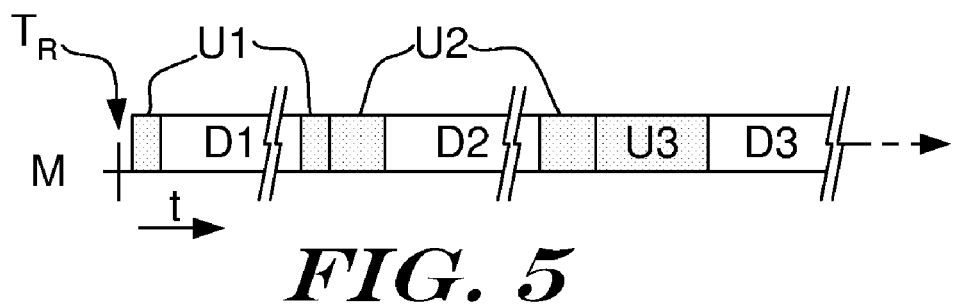
FIG. 5 illustrates a timing diagram for yet another illustrative embodiment.

FIG. 5 illustrates a timing diagram for yet another illustrative embodiment. FIG. 5 shows a schedule for a master device M. A reference time $T_R$ is shown. A first block of time is scheduled for communicating with device D1. Associated with the scheduled time for communicating with D1 are one or more uncertainty blocks U1. Because the error Δt (see above) may be either positive or negative (i.e. the remote device clock can be faster or slower than the master device clock), uncertainty blocks U1 are shown on either side of the scheduled time for communicating with D1.

After the scheduled communication with D1, the master device will communicate with D2. Again, uncertainty blocks U2 are shown on either side of the scheduled time for communicating with D2. The uncertainty blocks U2 are longer than uncertainty blocks U1. Specifically, because the communication with D2 occurs at a time that is more distant from the reference time $T_R$, the clock uncertainty is greater and so U2 is greater than U1. The same is true for U3, which is associated with communication with a third device D3. The clock uncertainty for some devices may vary depending upon the actual device as well; for example, some devices may have clocks with greater accuracy than the clocks in other devices.

It may be noted in FIG. 5 that the communication blocks D1, D2 are shown in broken fashion to indicate that the communication blocks D1, D2, may be of much longer duration than the uncertainty blocks. This is not critical to the invention, but is likely to occur in systems where relatively "good" clock devices are used. For example, a clock error of less than 1% will result in clock error that is, at least over short durations, relatively small. However, a 1% clock error range, if a significant number of remote devices are used, may result in various difficulties. No exact proportionality should be read from the dimensions of the figures.

It should be noted that the above illustrative examples and embodiments are shown with a limited number of devices for the purposes of illustration. More master devices and remote devices may be included in a given system. Further, there may also be intermediate node devices within the system, wherein such intermediate devices may or may not include sensing capability and may be used to relay data from a first sensing device toward a master device.

It should be noted that additional devices may be added to the above illustrative examples. The additional devices may include, for example, hard-wired devices that communicate using different media or components. Further, while the embodiment shown in FIG. 5 illustrates communications windows that are more or less adjacent one another, the communications may be more broadly separated, if desired.

Figure 6:
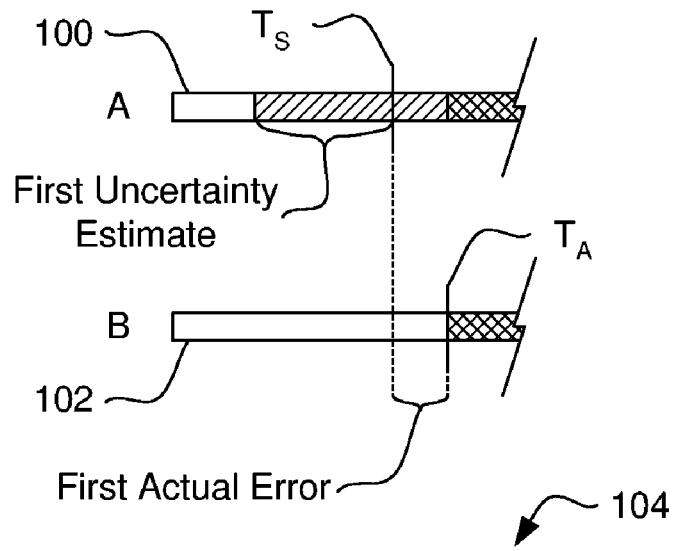
FIG. 6 illustrates an adaptive method for adjusting timing in a scheduled wireless transmission.
Figure 6:
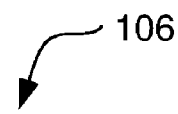

FIG. 6 illustrates an adaptive method for adjusting timing in a scheduled wireless transmission. Blocks 100 and 102 show a time line for communication between a first wireless communication unit, A, and a second wireless communication unit, B. A time $T_S$ is identified for communication. $T_S$ may be identified at a prior time such that, from a reference time, a duration of time to a communication time $T_S$ may be observed. As explained in some of the above illustrative embodiments, a time uncertainty may be calculated or estimated.

This time uncertainty may be used by the first unit A to create a window for communication with the second unit B, where A may set aside communication bandwidth for communicating with B. Actual communication with B may start when B generates a ready-to-send or ready-to-receive message and this message is received by A. Thus there is an actual communications time $T_A$.

In the illustrative, adaptive, method, the absolute error may be recorded by the first unit A, creating a data set related to communications with the second unit, B. A table showing such data appears at 104 in FIG. 6. Both absolute error and relative error may be included, where relative error takes into account a time duration that has passed since a reference time. For example, in FIG. 6, the relative error is shown as per cycle error. Other relative measures may be used, for example, because the relative error on a per-cycle basis may be rather small, another measure may be error per block of cycles. Relative error may be calculated on the basis of cycles with reference to either of the first unit A or the second unit B.

After several communications between A and B, communications statistics can be generated including, for example, mean and standard deviation. In the adaptive embodiment shown in FIG. 6, the mean and standard deviation may be used to narrow the adjustable communications window as shown at 106. For the purposes of the formula at 106, $\mu x$ represents the mean and $\sigma x$ represents standard deviation of per-cycle error, with N being the number of cycles from a most recent reference time to the scheduled time $T_S$, and $T_C$ is used to indicate the duration of communications expected to occur in the communication window. M may be a number chosen such that the communications window is wide enough to capture any communications by B, but which is not unduly large. M may vary as the number of samples in the data set 104 increases.

For example, an embodiment may make use of the communications window formula after 100 samples have been gathered into the data set 104. If M=5, then the start of the communications window may be set using a per-cycle error that is five standard deviations less than the mean per-cycle error. Subtraction of the product of M and the standard deviation from the mean allows the communication window to open earlier than it would if only the average error were used. The calculation of standard deviation and mean may be performed on a rolling basis for each communication or may be performed periodically.

The illustrative example of FIG. 6 is not only adaptive to individual communication devices in the system, but it also accounts for the duration between $T_S$ and a reference time by including the variable N. For example, while a number of devices may be built using a particular clock structure and those devices may be expect to operate in a similar manner, there may also be individual variations among similar devices in the system.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for wirelessly communicating between a first unit and a second unit, the method comprising:
    identifying a desired communication time at a selected time in the future; and
    identifying a time uncertainty that is dependent on the selected time in the future, wherein the identified time uncertainty is made larger when the selected time in the future is made larger; and
    identifying a communication window that overlaps with the desired communication time, the communication window having a duration that is related to the time uncertainty.

2. The method of claim 1 further comprising:
    communicating between the first unit and the second unit sometime during the communication window.

3. The method of claim 2 wherein the first unit operates in a sleep mode for at least a first time period prior to the communication time, the first unit activating to a non-sleep mode during the communication window.

4. The method of claim 1 wherein the time uncertainty is adaptive to the second unit.

5. A building monitoring system comprising:
    a master unit having wireless communication functionality; and
    a first remote unit having wireless communication functionality;
    the master unit scheduled to communicate with the first remote unit during a communication period that overlaps a desired communication time in the future;
        wherein a time uncertainty is generated and associated with the first remote unit, wherein the time uncertainty is related to a duration of time between a reference time and the scheduled communication time, and wherein the time uncertainty is made larger if the duration of time between the reference time and the scheduled communication time is made larger.

6. The system of claim 5 wherein the time uncertainty is generated by the first remote unit.

7. The system of claim 5 wherein the time uncertainty is generated by the master unit.

8. The system of claim 7 wherein the time uncertainty is communicated to the first remote unit.

9. The system of claim 5 further comprising a second remote unit having wireless communication functionality, wherein the master unit uses the time uncertainty in spacing scheduled transmissions from the remote units.

10. The system of claim 5 wherein the first remote unit is configured to have at least a low-power state and an active state, the low-power state being a state in which the first remote unit does not transmit or receive wireless signals, and the active state being a state in which the first remote unit may transmit and/or receive wireless signals.

11. The system of claim 10 wherein the first remote unit is configured to switch to the active state at a time associated by the time uncertainty with the communications time.

12. The system of claim 5 wherein the time uncertainty is generated using an adaptive method which takes into account previous timing errors of the first remote unit.

13. A method of operating a building monitoring system having at least a master device and a remote device both adapted for wireless communication, the method comprising:
    generating a schedule in which the remote device is configured to execute a low power sleep mode during a first time period and an active mode during a second time period, the remote device capable of communicating wirelessly with the master device while in the active mode, the second time period following the first time period;

defining a time uncertainty that is related to the duration of the first time period, wherein the time uncertainty is defined to be larger when the duration of the first time period is larger; and identifying a communication window that overlaps with the second time period, the communications window having a duration, wherein the duration of the communication window is related to the time uncertainty.

14. The method of claim 13 wherein the remote devices comprise building monitoring sensors.

15. The method of claim 13 wherein the time uncertainty is calculated by the master device and used by the master device to set the schedule.

16. The method of claim 15 wherein the master device communicates data from the schedule to the remote device to indicate when the remote device is to transmit data.

17. The method of claim 15 wherein the time uncertainty is used to space out remote device communications in the schedule.

18. The method of claim 13 wherein the time uncertainty is calculated by the remote device.

19. The method of claim 13 further comprising observing an environmental condition with the remote device and communicating data related to the environmental condition to the master device during the communication window.

20. A method of operating a building monitoring system comprising first and second peer devices wirelessly communicating with a base station, the method comprising:

generating a schedule in which the first and second peer devices communicate with the base station at first and second times that are exclusive of one another, the first and second times occurring first and second durations after a reference time;

wherein:

the first peer device is active during a first communicating time window that overlaps with the first time;

the second peer device is active during a second communicating time window that overlaps with the second time; and:

if the first duration is longer than the second duration, the first communicating time window is longer than the second communicating time window; and if the first duration is shorter than the second duration, the second communicating time window is longer than the first communicating time window.

* * * * *